United States Patent
Rottenkolber

[11] 4,225,237
[45] Sep. 30, 1980

[54] TIRE CHECKING APPARATUS

[75] Inventor: Hans Rottenkolber, Amerang near Rosenheim, Fed. Rep. of Germany

[73] Assignee: Opto Produkte AG, Zürich, Switzerland

[21] Appl. No.: 904,756

[22] Filed: May 11, 1978

[51] Int. Cl.³ .............................................. G01B 9/021
[52] U.S. Cl. ................................... 356/348; 356/3.63
[58] Field of Search ............... 350/3.63; 356/347, 348

[56] References Cited

U.S. PATENT DOCUMENTS

| | | | |
|---|---|---|---|
| 3,560,205 | 2/1971 | Urbach | 350/3.63 X |
| 3,976,380 | 8/1976 | Rottenkolber et al. | 356/348 |

*Primary Examiner*—John K. Corbin
*Assistant Examiner*—Matthew W. Koren
*Attorney, Agent, or Firm*—Becker & Becker, Inc.

[57] ABSTRACT

An apparatus for a laser interferometric tire checking in which a thermoplastic film serves as light sensitive layer, and in which optical members are provided in the path of the object beam diffusely reflected by the inner surface of the tire. By means of these optical members the spreading angle of the beam cone inciding upon the light sensitive layer is limited to less than 40°.

According to a specific embodiment of the invention, within the region of the radial central plane of the tire to be checked there is provided a mirror which is inclined relative to the last mentioned plane and is located in the path of the object beam which illuminates the inner surface of the tire to be checked and is reflected by this tire inner surface. According to a particularly advantageous embodiment of the invention, the tire and the mirror are turnable relative to each other parallel to the central tire plane. Furthermore, a negative lens system may be arranged in the beam cone of the object beam reflected by the inner tire surface onto the light sensitive layer. By means of this dispersion lens system, the spreading angle of the beam cone of the reflected object beam is, when inciding upon the light sensitive layer, narrowed down to less than 40°.

6 Claims, 4 Drawing Figures

TIRE CHECKING APPARATUS

The present invention relates to a tire checking device by means of which, with the aid of holographic interferometry, it will be possible to ascertain flaws in tire for land and air vehicles. These flaws may consist of detachments or delaminations, faulty connections or enclosures of liquid or gas in the layer construction of the tire which faulty areas may have a size within the micrometer range. By creating a change in the pressure in the atmosphere surrounding the tire, such faulty areas will, in view of the expansion of the gases enclosed therein, form bulges on the tire surface, especially on the inner wall of the tire. In a hologram taken prior to and during the change of the ambient pressure, interference figures are obtained which are generated by the bulges and which indicate the faulty areas in the form of concentric circles and determine the location of these faulty areas.

A tire checking device of the above mentioned general type has become known according to which within the tire and, more specifically, in its radial central plane there is centered a light sensitive layer for producing a hologram. Furthermore, this layer has associated therewith picture forming means, such as optical means, for the illumination of the inner surface of the tire, and the guiding system for a reference beam upon the light sensitive layer. The illuminating beam and the reference beam are branched off from the same coherent light source. With this arrangement, only one tire section can be observed at a time and maximally of the size of a quadrant. Therefore, the tire is rotatably arranged so that a total of four holograms of the tire inner surface can be obtained while each time the tire is turned by 90°.

It is, therefore, an object of the present invention to provide a tire checking device of the above mentioned general type which will greatly simplify the checking of tires.

This object and other objects and advantages of the invention will appear more clearly from the following specification in connection with the accompanying drawings, in which.

In customary manner, as light sensitive layer there is employed a silver halogen emulsion in connection with which the picture angle of approximately 90° can be fully taken advantage of. The employment of such photo material, however, causes considerable delay of the picture observation in view of the wet developing steps necessary for this picture material.

Therefore, it is desirable to employ a thermoplastic picture material which requires only a very short physical developing process which can be carried out on the spot and therefore also permits a live observation. Such picture material has the drawback that only an opening angle is possible for the picture of less than 40°, preferably 30°. Thus, with the described device, only one section of the tire of less than 40° can at best be observed, as will also be evident from simple geometric considerations.

Figure 1:
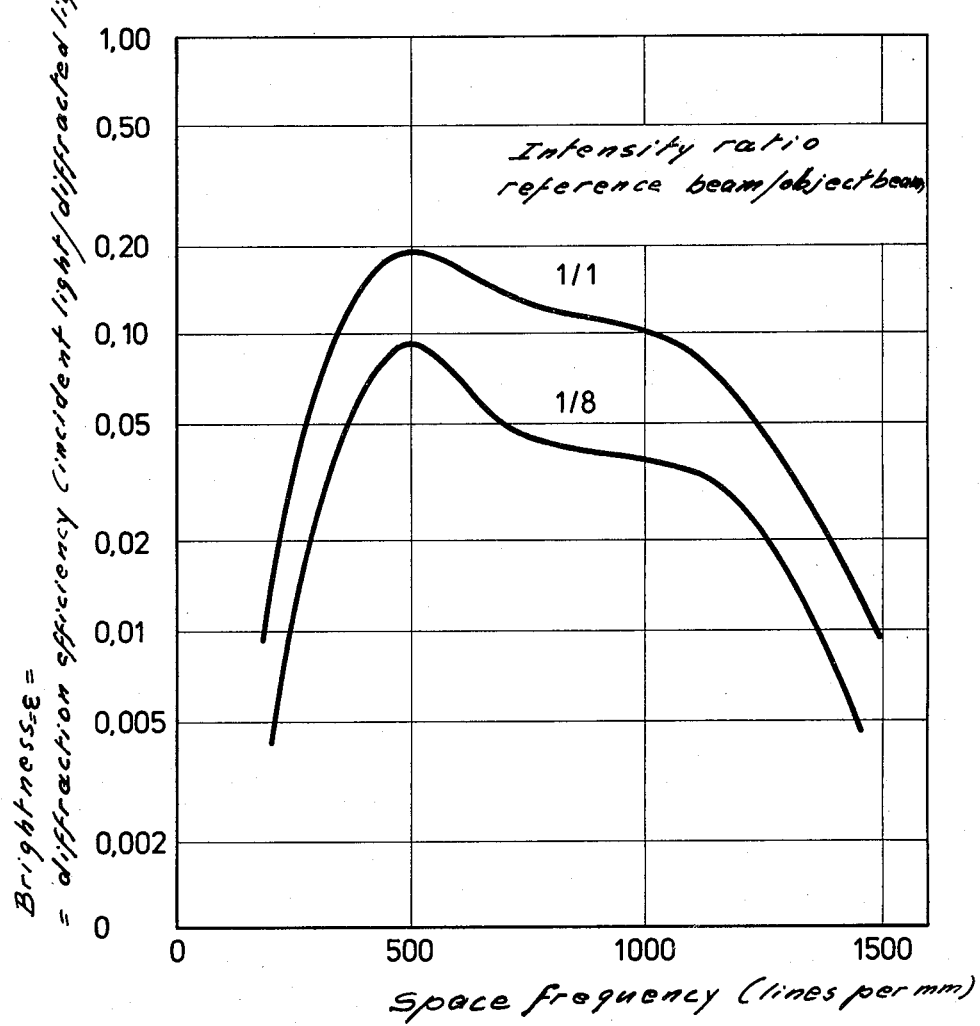
FIG. 1 is a diagram illustrating the diffraction efficiency with regard to the space frequency.

The reasons for these facts are as follows: From the diagram of FIG. 1 there will be seen the relationship between the diffraction efficiency and the space frequency, while the diffraction efficiency=brightness of the diffraction picture equals the ratio of incident light and diffracted light. The space frequency=the number of the interference lines per millimeter is proportional to the color of the employed laser light. In this connection, the formula applies:

$$\epsilon = (2/\lambda) \times \sin(\alpha/2),$$

in which $\lambda$ designates the length of the light wave and $\alpha$ represents the opening angle between object beam and reference beam. On this basis it can be calculated that the optimum of the spreading of the light cone inciding on the light sensitive layer lies with helium/neon laser light within 29.5° and with argon/neon light lies within 24°.

The arrangement according to the present invention, by means of which the method of the laser interferometric tire checking known per se, can be carried out by employing a thermoplastic film is characterized primarily by optical means arranged in the beam path of the light of the object beam which light is diffusely reflected by the tire inner surface, the optical means permitting a reduction of the spreading angle of the diffusely reflected radiation of the object beam by the inner tire surface which radiation incides upon the light sensitive layer. These optical means may consist of a deflecting mirror by means of which the radiation is deflected out of the radial central plane of the tire so that the light sensitive layer can be arranged at such optical distance from the inner surface of the tire that the radiation of the object beam inciding upon the tire inner surface forms the desired acute spreading angle. Furthermore, the optical means may form a dispersion lens arrangement provided between the tire inner surface and the light sensitive means. By means of the dispersion lens arrangement, the opening of the spreading angle of the beam inciding upon the light sensitive layer and diffusely reflected by the inner surface of the tire is reduced in the desired manner. In this instance, the light sensitive layer may be arranged within the region of the radial central plane of the tire.

Figure 2:
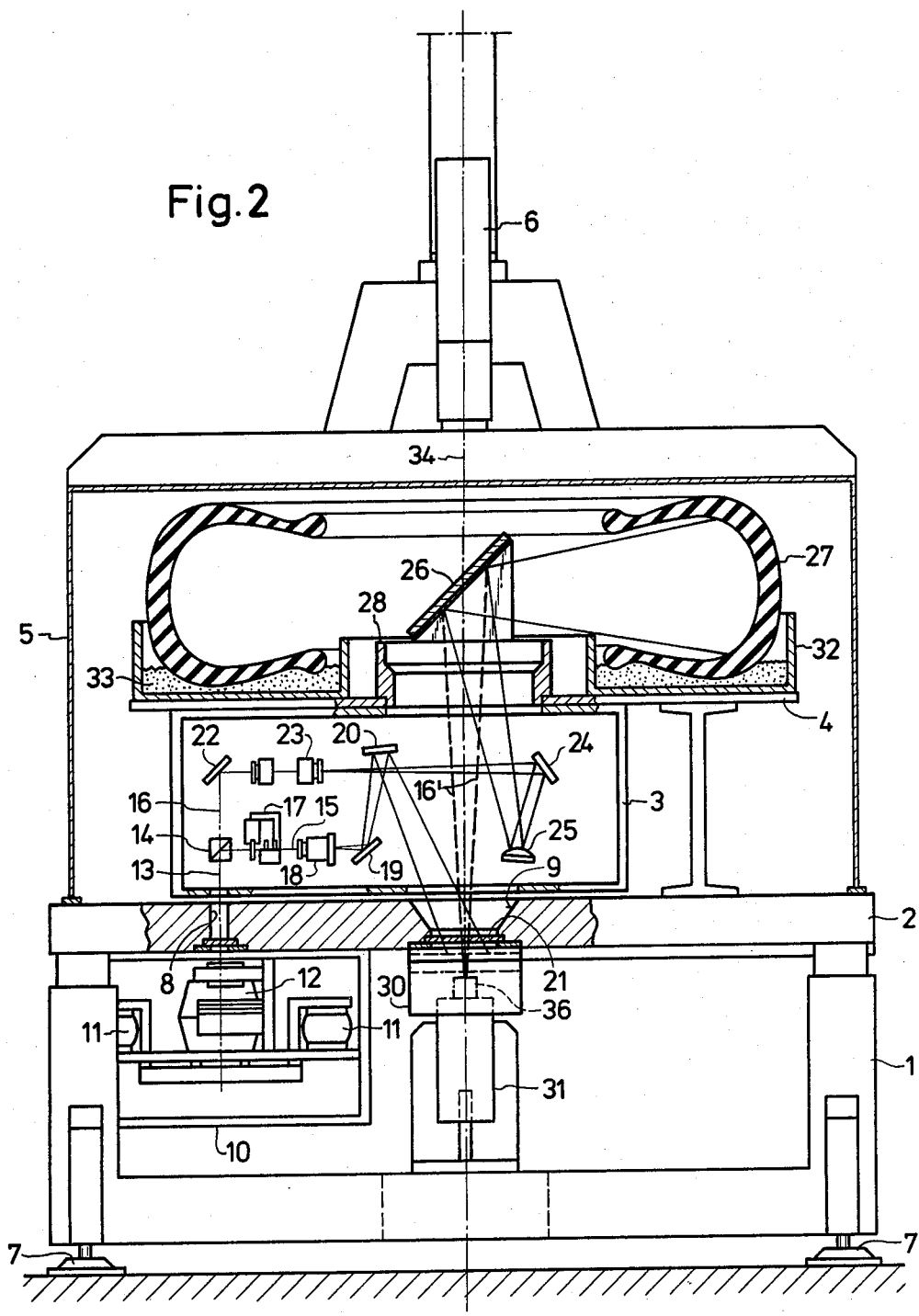
FIG. 2 shows an axial section through an arrangement according to the invention.

Referring now to FIG. 2 of the drawings, the tire checking device according to the invention as shown therein comprises a frame-like heavy and stable base part 1 on which rests a heavy base plate 2. The base plate 2 supports a housing 3 which contains the optical control elements and which also comprises a shoulder-shaped tire support 4. Upon the base plate 2, in an airtight manner, there rests a removable hood 5 which can be lifted and lowered by a hydraulic lifting device 6 in order to be able to introduce and remove a tire to be checked.

The base part 1 may be movable on wheels not shown, but when the device is in operation, the base part rests on legs 7 adapted to be screwed in and out. By means of the legs 7, the base plate can be adjusted horizontally. In the base plate 2 there are provided passages 8 and 9 for the light beams which passages, however, are closed in an air-tight manner. Below the passage 8 in a housing 10, the laser 12 rests on rubber bearings 11, the laser having its axis vertially arranged with regard to the drawing plane. Vibrations, resulting from the manipulation of the tire, relative to the laser 12 are for all practical purposes completely suppressed by the mass of the base plate 2 and the rubber bearings 11.

A mirror not visible in FIG. 2 deflects the light beams 13 emitted by the laser in the direction of the passage 8. In the dividing cube 14, the light beams 13 are split up into the reference beam 15 and the object beam 16. The reference beam 15 passes through the photo shutter 17, the spreading optic 18 and the deflecting mirrors 19 and 20 and incides upon the light sensitive layer 21 through the passage 9. The object beam 16 passes through the deflecting mirror 22, the spreading optic 23, the deflecting mirror 24 and a convex mirror 25 and by means of a plane mirror 26, which is inclined with regard to the radial central plane of the tire 27 to be checked by 45°, is projected on a quadrant of the inner surface of the tire to be checked which inner surface is thus over said section illuminated by the object beam. The radiation of the object beam 16' diffusely reflected by the inner surface of the quadrant is by the light passage 9 in the base plate 2 directed upon the light sensitive layer 21 and is focused in the observation point. The mirror 26 is arranged on the top side of a cylindrical mount 28 of the housing 3.

In the light passage 9 there is arranged a photo camera 30 in which is effected the picture advance of the film carrying the light sensitive layer 21, and in which the light sensitive layer is made light sensitive, is developed and fixed. Below the light sensitive layer 21 in its position occupied during the exposure there is provided a television camera 31 the optical axis of which coincides with the central axis of the tire 27. The photo camera and the television camera 31 are removable. Instead of the television camera, also a single picture camera may be inserted.

The tire 27 to be checked is introduced into an exchangeable bearing box 32 and in the same rests on a flat pile of quartz sand 33. This way of supporting the tire serves the following purpose: By handling the tire to be checked, the latter is subjected to bending and distorsion stresses which only after a certain time will disappear by creeping back and consequently will, during the creeping period, form interference lines which would cause disturbances in the interference picture. It is, therefore, necessary to allow the tire to rest during this creeping period. In order to maintain the desired cycle time and not have to wait for the resting of the time while it in the device itself, it is advantageous to provide a plurality of bearing boxes in which the resting of the tire occurs outside the device.

By means of the bearing boxes 23, the tire 27 to be checked can be turned by 90° about its central axis after each picture taking so that successively pictures of each quadrant of the white inner surface can be taken. To this end, instead of the bearing elements illustrated in FIG. 1, a separate annular rotatable table may be provided which is rotatable relative to the tire support 4. The relative turning between mirror and tire can, of course, also be effected by turning the mirror 26 while the tire remains stationary.

The keeping within the desired cycle periods makes it necessary that the light sensitive layer can be observed immediately after the exposure thereof. This excludes the employment of a silver layer material because such material would, for the chemical development and fixing, have to be taken out of the device and reintroduced into the same. A live observation method would furthermore necessitate an adjustment of the location of the picture taking which can practically not be done. For this reason, a thermoplastic film material of high dissolving ability is employed which is deposited on a film. This material is in the camera 31 first electrostatically charged, then exposed to the picture of the unexpanded tire, and subsequently is developed by heat and fixed by cooling. By means of the thus obtained picture, which during the development and fixing remain in its position, the tire to be checked which is then exposed to a slight underpressure can be observed according to the live method by the television camera 31 and a non-illustrated monitor. In this connection, not a picture of the state or condition is obtained, but a picture of the chronologically developing interference figures which are produced by the increasing bulges indicating the faulty areas. Similarly, a hologram can be created by double exposure at atmospheric pressure and at underpressure.

From the speed at which during the live observation the annular interference figures develop, conclusions can be drawn concerning the type and magnitude of the flaws. Those flaws which are located closer to the observed tire surface develop faster than flaws which are located in the depth of the tire material, and smaller flaws develop slower than large flaws. By setting the respective observation period, it is thus possible to sort out certain types of flaws.

Figure 3:
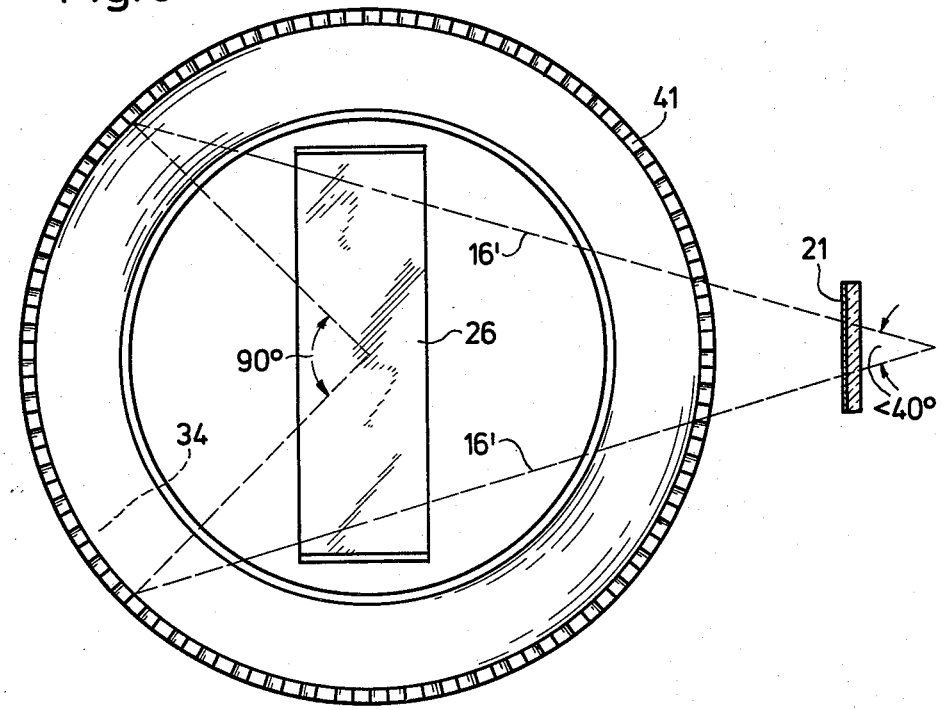
FIG. 3 is a diagrammatic top view of a tire which, in conformity with FIG. 2, is observed from below and with a beam path folded by 90° into the plane of the drawing, after the beam path has been deflected by the deflection mirror.

FIG. 3 shows in conformity with the arrangement of FIG. 2 as seen from below the beam path of the object beam 16' reflected by the inner surface of the tire quadrant 34, the object beam 16' being deflected by the mirror 26 from the picture plane upon the light sensitive layer 21 while the mirror 26 is inclined to the picture plane at an angle of 45°. In this connection it has been found that the opening angle of the beam bundle 16' can reduce the angle larger than 40°, which is possible only without the deflection, to an angle of 30° as it is necessary with a light sensitive layer.

It is possible to arrange the mirror 26 outside the center point of the radial tire plane but within the tire.

Figure 4:
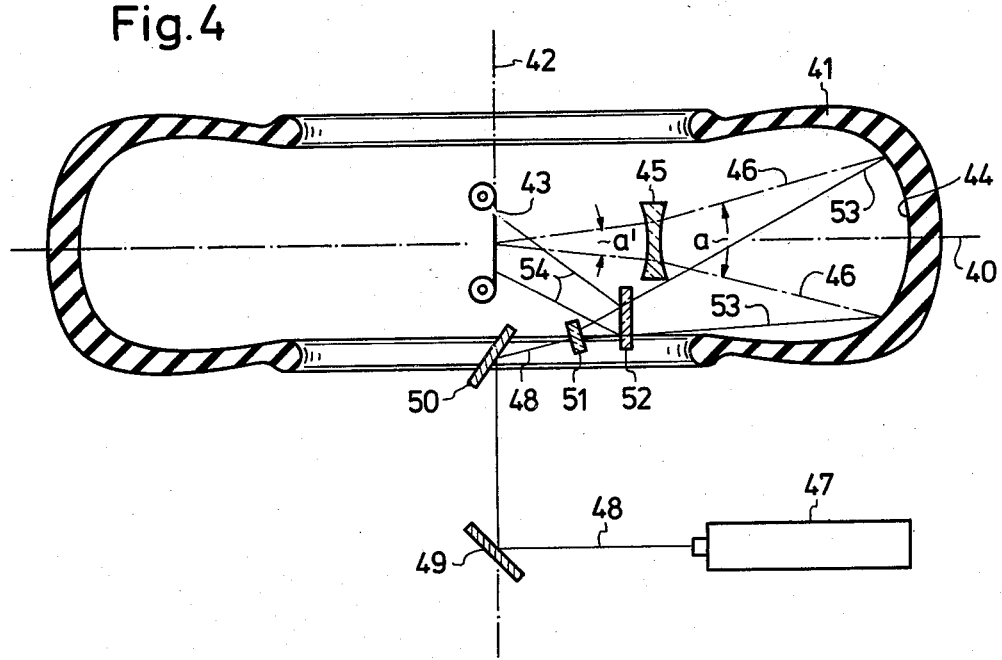
FIG. 4 shows a diagrammatic illustration of the beam path of an arrangement according to the invention in which a dispersion lens arrangement is provided.

A further modification of the invention is illustrated in FIG. 4. In the point of intersection of the radial central plane 40 of the tire 41 with the axis 42 of the tire, the light sensitive layer 43 is provided which is expediently located in a non-illustrated camera which stores a thermoplastic film, and which is adapted to make the film light sensitive, to expose it to light, and to develop and fix the same.

This light sensitive layer 43 or the camera and the tire 41 are turnable relative to each other in the plane 40. Between the light sensitive layer and the inner surface 44 of the tire 41 to be observed there is arranged a negative lens 45 by means of which the width of the spreading angle a of the beam cone 46 diffusely reflected by the inner surface 44 of the tire can be reduced to the width of the angle a' at which the beam cone incides upon the light sensitive layer 43.

Below the tire 41, in conformity with the arrangement of FIG. 2, a laser 47 can be provided. The radiation 48 of the laser 47 is deflected by the mirror 49 and by a further mirror 50 and is widened in a spreading optic 51. The dividing plate 52 divides the spread out beam 48 into the object beam 53 directed upon the tire inner surface 44 and into the reference beam 54 directed onto the light sensitive layer 43. The object beam 53 is diffusely reflected by the tire inner surface 44. A beam cone 55 of this reflected light is incided by the negative lens system 45 onto the light sensitive layer 43 while being narrowed by the dispersion lens system 45 to an angle of less than 40°.

In order to be able to observe the entire tire inner surface, it is necessary either to turn the tire relative to the described optical arrangement by an angle of 90°. On the other hand, if the light sensitive layer is to be turned relative to the tire, the deflecting mirror 50, the spreading optic 51, the dividing plate 52, and the dispersion lens system 54 have to be turned in the same manner so that expediently they should be arranged together in a rotatable housing.

It is of course to be understood that the present invention is, by no means, limited to the specific showing in the drawings but also encompasses any modifications within the scope of the appended claims.

What I claim is:

1. An arrangement for laser interferometric tire checking comprising in combination: a laser beam emitter, means for processing an emitted laser beam including means for dividing an emitted laser beam into a reference beam and an object beam adapted to be diffusely reflected by an inner surface of a tire being checked, a thermoplastic film as a light sensitive layer arranged to receive at least a reference beam, optical means arranged in the path of the object beam diffusely reflected by the inner surface of the tire being checked to thereby reduce the spreading angle of the pertaining beam cone impinging upon the light sensitive layer at an angle of less than 40°.

2. An arrangement for laser interferometric tire checking in combination according to claim 1, wherein said optical means is a mirror which is inclined to the plane within the region of the radial central plane of the tire being checked and which is located in the path of that object beam which is to illuminate the inner surface of the tire being checked and which is reflected by said inner tire surface.

3. An arrangement in combination according to claim 2, in which said mirror is located in the point of intersection of the radial central plane of the tire being checked with the tire axis, said mirror being inclined at an angle of about 45° relative to the radial central plane of the tire being checked.

4. An arrangement for laser interferometric tire checking in combination according to claim 2 wherein said mirror is adapted to be turned relative to the tire being checked and is adapted to be parallel to the central plane of said tire.

5. An arrangement for laser interferometric tire checking in combination according to claim 1 wherein said optical means includes a lens arrangement locatable in the beam cone of the object beam which is reflected by the inner surface of the tire being checked onto the light sensitive layer to thereby narrow the spreading angle of the beam cone of the reflected object beam to an angle of less than 40° when the object beam impinges upon the light sensitive layer, said lens arrangement including at least one divergent lens.

6. An arrangement in combination according to claim 5, wherein the tire, the light sensitive layer and said means for processing are turnable relative to each other and parallel to the central plane of the tire being checked.

* * * * *